Patented Mar. 28, 1933

1,903,196

UNITED STATES PATENT OFFICE

WERNER SCHULEMANN, OF VOHWINKEL NEAR ELBERFELD, AND FRITZ SCHÖNHÖFER AND AUGUST WINGLER, OF ELBERFELD, GERMANY, ASSIGNORS TO WINTHROP CHEMICAL COMPANY, INC., OF NEW YORK, N. Y., A CORPORATION OF NEW YORK

SUBSTITUTED AMINO QUINOLINES AND PROCESS OF MAKING THE SAME

No Drawing. Application filed December 16, 1927, Serial No. 240,620, and in Germany December 20, 1926.

The present invention relates to compounds of the general formula

wherein the quinoline nucleus may be further substituted by alkoxy groups and wherein R stands for a six membered nucleus which may be connected with the amino group by an ethylene radical, said nucleus containing one nitrogen atom in cyclic linkage or attached to the nucleus in form of an amino group which may be substituted by alkyl groups, and to a process of preparing these compounds.

We have found that these compounds are exceedingly valuable and effective new remedies for use in therapy.

The manufacture of our new compounds can be effected in several ways, for instance, by reacting upon a compound of the general formula

wherein the quinoline nucleus may be further substituted by alkoxy groups, with a compound of the general formula

X.R wherein X represents halogen and R stands for a six membered nucleus which may be connected with the halogen atom by an ethylene radical, said nucleus containing at least one nitrogen atom in cyclic linkage or attached to the nucleus in form of an amino group which may be substituted by alkyl groups.

Instead of the compounds of the above formula X.R one may use a salt of these compounds with an inorganic acid or a substitution product thereof, such as the bromo-ethyl-phthalimide compound; in the last case the phthalic acid is to be split off subsequently.

*Example 1*

[structure diagram showing 8-aminoquinoline with NH—CH$_2$—CH$_2$—N(CH$_2$—CH$_2$)$_2$CH$_2$ piperidine substituent]

For the manufacture of this compound, 184 parts by weight of the hydrochloric acid salt of N-piperidyl-β-ethyl-chloride are melted together with 144 parts by weight of 8-aminoquinoline at 130–140° C. for 8 hours, while stirring. The melt is boiled out with 2000 parts of water and the solution thus obtained is filtered. The filtrate is cooled and salted out with potassium carbonate, the resinous mass which is thus precipitated being extracted with ether. The ether solution is thereupon washed several times with water, then dried and the ether distilled off. The residue thus obtained is steam-distilled until all traces of 8-aminoquinoline are eliminated. Thereupon the residue is again extracted with ether and after drying with potassium carbonate, the ether is distilled off. The remaining quinoline derivative solidifies easily to crystals, melting at 59–60° C. It boils at a temperature of 180–182° C. under 1 mm. pressure. The hydrochloride which melts at 190–191° C. is soluble in water.

*Example 2*

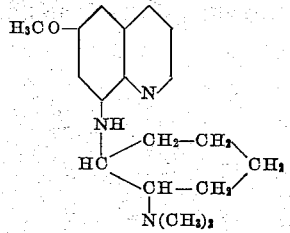

The manufacture of this compound is effected by melting together 174 parts by weight of 6-methoxy-8-aminoquinoline with 287 parts by weight of the hydrobromide of 1-dimethylamino-2-cyclohexylbromide at 140–150° C. for 8 hours, while stirring.

The resulting quinoline compound is a light yellow oil, which solidifies to a glassy mass and boils at 192–195° C. under 1 mm. pressure. The hydrochloride is easily soluble in water.

*Example 3*

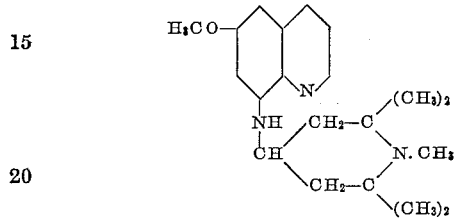

For the manufacture of this compound, 174 parts by weight of 6-methoxy-8-aminoquinoline are melted together with 305 parts by weight of the hydrobromide of N-methyl-α-α'-tetramethyl-γ-bromopiperidine at 160–170° C. for some 8 hours, while stirring. The resulting quinoline compound is a light yellow oil, boiling at 215–218° C. under 0.5 mm. pressure. The hydrochloride is easily soluble in water.

We claim:—

1. The compounds of the general formula

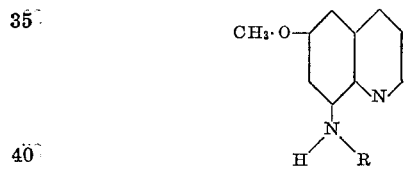

wherein R represents a hydroaromatic radical which is substituted by secondary or tertiary amino groups being suitable for pharmaceutical purposes.

2. The compounds of the general formula

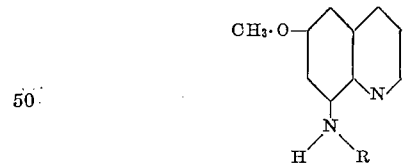

wherein R represents a hydroaromatic radical which is substituted by a dimethylamino residue being suitable for pharmaceutical purposes.

3. The compound of the formula

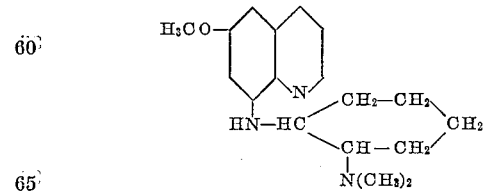

being a light yellow oil, which solidifies to a glassy mass and boiling at 192–195° C. under a pressure of 1 mm. being suitable for pharmaceutical purposes.

4. The process of producing a compound of the formula

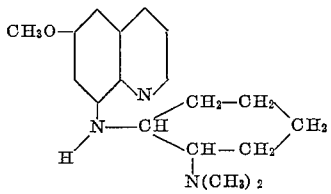

which comprises reacting upon—6-methoxy-8-amino-quinoline with 1-chloro-2-dimethylamino cyclohexane.

5. The compounds of the probable general formula:

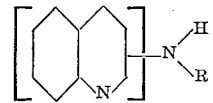

wherein the quinoline radical may be further substituted by an alkoxy group and wherein R represents a six membered nucleus which may be connected with the amino group of the quinoline ring by an ethylene radical, said nucleus containing one nitrogen atom in cyclic linkage or attached to the nucleus in form of an amino group, which may be substituted by alkyl groups, said compounds being suitable for pharmaceutical purposes.

6. The compounds of the probable general formula:

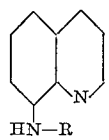

wherein the quinoline radical may be further substituted by an alkoxy group and wherein R represents a six membered nucleus which may be connected with the amino group of the quinoline ring by an ethylene radical, said nucleus containing one nitrogen atom in cyclic linkage or attached to the nucleus in form of an amino group, which may be substituted by alkyl groups, said compounds being suitable for pharmaceutical purposes.

7. The compounds of the probable general formula:

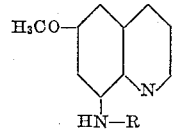

wherein R represents a six membered nucleus which may be connected with the amino group of the quinoline ring by an ethylene radical, said nucleus containing one nitrogen atom in cyclic linkage or attached to the nucleus in form of an amino group, which may be substitued by alkyl groups, said compounds being suitable for pharmaceutical purposes.

8. The process which comprises reacting upon a compound of the general probable formula:

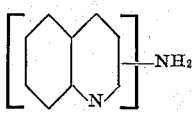

wherein the quinoline radical may be further substituted by an alkoxy group, with a compound of the general formula X—R, wherein X represents halogen and R represents a six membered nucleus which may be connected with the halogen atom by an ethylene radical, said nucleus containing one nitrogen atom in cyclic linkage or attached to the nucleus in form of an amino group, which may be substituted by alkyl groups, said compounds being suitable for pharmaceutical purposes.

9. The process which comprises reacting upon a compound of the probable formula:

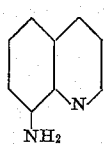

wherein the quinoline radical may be further substituted by an alkoxy group, with a compound of the general formula X—R, wherein X represents halogen and R represents a six membered nucleus which may be connected with the halogen atom by an ethylene radical, said nucleus containing one nitrogen atom in cyclic linkage or attached to the nucleus in form of an amino group, which may be substituted by alkyl groups.

10. The process which comprises reacting upon 8-aminoquinoline with the hydrochloride of N-piperidyl-$\beta$-ethylchloride while heating.

11. The process which comprises reacting upon 6-methoxy-8-aminoquinoline with a compound of the general formula X—R, wherein X represents halogen and R represents a six membered nucleus which may be connected with the halogen atom by an ethylene radical, said nucleus containing one nitrogen atom in cyclic linkage or attached to the nucleus in form of a amino group, which may be substituted by alkyl groups.

12. The process which comprises reacting upon 6-methoxy-8-aminoquinoline with the hydrobromide of N-methyl-alpha-alpha'-tetramethyl-gamma-bromopiperidine while heating.

13. The compound of the probable formula:

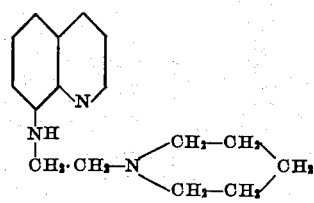

boiling under 1 mm. pressure at 180–182° C., forming crystals of the melting point 59–60° C., forming a water-soluble hydrochloride of the melting point 190–191° C. being suitable for pharmaceutical purposes.

14. The compound of the probable formula:

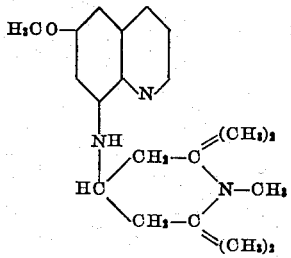

boiling under 0.5 mm. pressure at 215–218° C. as a light yellow oil, forming a water-soluble hydrochloride, being suitable for pharmaceutical purposes.

In testimony whereof we have hereunto set our hands.

WERNER SCHULEMANN.
FRITZ SCHÖNHÖFER.
AUGUST WINGLER.